(12) United States Patent
Sampsell

(10) Patent No.: US 7,706,050 B2
(45) Date of Patent: Apr. 27, 2010

(54) INTEGRATED MODULATOR ILLUMINATION

(75) Inventor: Jeffrey B. Sampsell, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 10/794,825

(22) Filed: Mar. 5, 2004

(65) Prior Publication Data

US 2005/0195468 A1    Sep. 8, 2005

(51) Int. Cl.
*G02B 26/00* (2006.01)
*G02B 26/08* (2006.01)
*G02F 1/29* (2006.01)

(52) U.S. Cl. .................. 359/292; 359/290; 359/291; 359/298

(58) Field of Classification Search .......... 359/290, 359/291, 292, 297, 298, 245, 231; 362/245, 362/231; 345/245, 231
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,448,334 A | 6/1969 | Frost | |
| 3,653,741 A | 4/1972 | Marks | |
| 3,656,836 A | 4/1972 | de Cremoux et al. | |
| 3,725,868 A | 4/1973 | Malmer, Jr., et al. | |
| 3,813,265 A | 5/1974 | Marks | |
| 3,886,310 A | 5/1975 | Guldberg et al. | |
| 3,924,929 A | 12/1975 | Holmen | |
| 3,955,880 A | 5/1976 | Lierke | |
| 4,099,854 A | 7/1978 | Decker et al. | |
| 4,196,396 A | 4/1980 | Smith | |
| 4,228,437 A | 10/1980 | Shelton | |
| 4,287,449 A | 9/1981 | Takeda et al. | |
| 4,375,312 A | 3/1983 | Tangonan | |
| 4,377,324 A | 3/1983 | Durand et al. | |
| 4,378,567 A | 3/1983 | Mir | |

(Continued)

FOREIGN PATENT DOCUMENTS

CN    1381752    11/2002

(Continued)

OTHER PUBLICATIONS

Akasaka,"Three-Dimensional IC Trends," Proceedings of IEEE, vol. 74, No. 12, pp. 1703-1714 (Dec. 1986).

(Continued)

*Primary Examiner*—Ricky L Mack
*Assistant Examiner*—Brandi N Thomas
(74) *Attorney, Agent, or Firm*—Knobbe Martens Olson & Bear LLP

(57) ABSTRACT

A spatial light modulator includes an array of elements to modulate light in accordance with image data. The modulator has a display panel having first and second surfaces arranged adjacent to the array of elements such that the second surface is directly adjacent the array of elements to allow a viewer to view an image produced by modulation of light. The modulator may also include a light source to provide light to the display panel and illumination dots on the first surface of the display panel to reflect light from the source to the array of elements.

21 Claims, 4 Drawing Sheets

U.S. PATENT DOCUMENTS

| | | |
|---|---|---|
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,590,128 A | 5/1986 | Kawai |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,850,682 A | 7/1989 | Gerritsen |
| 4,856,863 A | 8/1989 | Sampsell et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,974,942 A | 12/1990 | Gross |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,050,946 A | 9/1991 | Hathaway |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,164,858 A | 11/1992 | Aguilera, Jr. et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,291,314 A | 3/1994 | Agranat |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,426 A | 7/1994 | Tam et al. |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,339,179 A | 8/1994 | Rudisill |
| 5,345,322 A | 9/1994 | Fergason et al. |
| 5,345,328 A | 9/1994 | Fritz et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,398,125 A | 3/1995 | Willett et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,452,385 A | 9/1995 | Izumi |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,467,417 A | 11/1995 | Nakamura |
| 5,474,865 A | 12/1995 | Vasudev |
| 5,481,385 A | 1/1996 | Zimmerman et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,515,184 A | 5/1996 | Caulfield |
| 5,517,347 A | 5/1996 | Sampsell |
| 5,521,797 A | 5/1996 | Kashima |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,555,160 A | 9/1996 | Tawara |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,592,332 A | 1/1997 | Nishio |
| 5,594,830 A | 1/1997 | Winston |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |

| Patent | Date | Inventor |
|---|---|---|
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky et al. |
| 5,641,391 A | 6/1997 | Hunter et al. |
| 5,646,768 A | 7/1997 | Kaeiyama |
| 5,647,036 A | 7/1997 | Deacon et al. |
| 5,650,865 A | 7/1997 | Smith |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,659,410 A | 8/1997 | Koike |
| 5,665,997 A | 9/1997 | Weaver et al. |
| 5,671,994 A | 9/1997 | Ping-Kaung |
| 5,673,128 A | 9/1997 | Ohta et al. |
| 5,673,139 A | 9/1997 | Johnson |
| 5,683,591 A | 11/1997 | Offenberg |
| 5,703,667 A | 12/1997 | Ochiai |
| 5,703,710 A | 12/1997 | Brinkman et al. |
| 5,710,656 A | 1/1998 | Goosen |
| 5,726,480 A | 3/1998 | Pister |
| 5,735,590 A | 4/1998 | Kashima |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,771,321 A | 6/1998 | Shapiro et al. |
| 5,783,614 A | 7/1998 | Chen |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,810,464 A | 9/1998 | Ishikawa |
| 5,815,229 A | 9/1998 | Shapiro et al. |
| 5,818,095 A | 10/1998 | Sampsell |
| 5,825,528 A | 10/1998 | Goossen |
| 5,835,255 A | 11/1998 | Miles |
| 5,842,088 A | 11/1998 | Thompson |
| 5,854,872 A | 12/1998 | Tai |
| 5,883,684 A | 3/1999 | Millikan et al. |
| 5,892,598 A | 4/1999 | Asakawa |
| 5,912,758 A | 6/1999 | Knipe et al. |
| 5,913,594 A | 6/1999 | Iimura |
| 5,914,804 A | 6/1999 | Goossen et al. |
| 5,920,417 A | 7/1999 | Johnson |
| 5,933,183 A | 8/1999 | Enomoto et al. |
| 5,943,158 A | 8/1999 | Ford et al. |
| 5,959,763 A | 9/1999 | Bozler et al. |
| 5,982,540 A | 11/1999 | Koike |
| 5,986,796 A | 11/1999 | Miles |
| 6,014,192 A | 1/2000 | Lehureau |
| 6,028,690 A | 2/2000 | Carter et al. |
| 6,031,653 A | 2/2000 | Wang et al. |
| 6,038,056 A | 3/2000 | Florence et al. |
| 6,040,937 A | 3/2000 | Miles |
| 6,048,071 A | 4/2000 | Sawayama |
| 6,049,317 A | 4/2000 | Thompson et al. |
| 6,055,090 A | 4/2000 | Miles |
| 6,061,075 A | 5/2000 | Nelson et al. |
| 6,073,034 A | 6/2000 | Jacobsen |
| 6,074,069 A | 6/2000 | Chao-Ching |
| 6,088,102 A | 7/2000 | Manhart |
| 6,091,469 A | 7/2000 | Naito |
| 6,099,132 A | 8/2000 | Kaeriyama |
| 6,099,134 A | 8/2000 | Taniguchi |
| 6,100,872 A | 8/2000 | Aratani et al. |
| 6,113,239 A | 9/2000 | Sampsell et al. |
| 6,128,077 A | 10/2000 | Jovin |
| 6,147,790 A | 11/2000 | Meier et al. |
| 6,160,833 A | 12/2000 | Floyd et al. |
| 6,180,428 B1 | 1/2001 | Peeters et al. |
| 6,195,196 B1 | 2/2001 | Kimura et al. |
| 6,196,691 B1 | 3/2001 | Ochiai |
| 6,199,989 B1 | 3/2001 | Maeda et al. |
| 6,201,633 B1 | 3/2001 | Peeters et al. |
| 6,232,936 B1 | 5/2001 | Gove et al. |
| 6,232,937 B1 | 5/2001 | Jacobsen |
| 6,243,149 B1 | 6/2001 | Swanson et al. |
| 6,273,577 B1 | 8/2001 | Goto |
| 6,282,010 B1 | 8/2001 | Sulzbach et al. |
| 6,288,824 B1 | 9/2001 | Kastalsky |
| 6,292,504 B1 | 9/2001 | Halmos |
| 6,295,154 B1 | 9/2001 | Laor et al. |
| 6,301,000 B1 | 10/2001 | Johnson |
| 6,323,982 B1 | 11/2001 | Hornbeck |
| 6,342,970 B1 | 1/2002 | Sperger et al. |
| 6,381,022 B1 | 4/2002 | Zavracky et al. |
| 6,407,785 B1 | 6/2002 | Yamazaki |
| 6,412,969 B1 | 7/2002 | Torihara |
| 6,447,126 B1 | 9/2002 | Hornbeck |
| 6,454,452 B1 | 9/2002 | Sasagawa |
| 6,456,279 B1 | 9/2002 | Kubo |
| 6,465,355 B1 | 10/2002 | Horsley |
| 6,466,354 B1 | 10/2002 | Gudeman |
| 6,466,358 B2 | 10/2002 | Tew |
| 6,473,274 B1 | 10/2002 | Maimone et al. |
| 6,480,177 B2 | 11/2002 | Doherty et al. |
| 6,493,475 B1 | 12/2002 | Lin |
| 6,496,122 B2 | 12/2002 | Sampsell |
| 6,512,626 B1 | 1/2003 | Schmidt |
| 6,522,794 B1 | 2/2003 | Bischel et al. |
| 6,538,813 B1 | 3/2003 | Magno et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,570,584 B1 | 5/2003 | Cok et al. |
| 6,574,033 B1 | 6/2003 | Chui et al. |
| 6,582,095 B1 | 6/2003 | Toyoda |
| 6,589,625 B1 | 7/2003 | Kothari et al. |
| 6,592,234 B2 | 7/2003 | Epstein |
| 6,597,419 B1 | 7/2003 | Masakazu et al. |
| 6,598,987 B1 | 7/2003 | Parikka |
| 6,600,201 B2 | 7/2003 | Hartwell et al. |
| 6,603,520 B2 | 8/2003 | Umemoto |
| 6,606,175 B1 | 8/2003 | Sampsell et al. |
| 6,625,047 B2 | 9/2003 | Coleman, Jr., deceased |
| 6,630,786 B2 | 10/2003 | Cummings et al. |
| 6,631,998 B2 | 10/2003 | Egawa |
| 6,632,698 B2 | 10/2003 | Ives |
| 6,636,358 B2 | 10/2003 | Umemoto et al. |
| 6,642,913 B1 | 11/2003 | Chuang et al. |
| 6,643,069 B2 | 11/2003 | Dewald |
| 6,650,455 B2 | 11/2003 | Miles |
| 6,652,109 B2 | 11/2003 | Nakamura |
| 6,657,683 B2 | 12/2003 | Richard |
| 6,660,997 B2 | 12/2003 | Laberge |
| 6,666,561 B1 | 12/2003 | Blakley |
| 6,669,350 B2 | 12/2003 | Yamashita |
| 6,674,090 B1 | 1/2004 | Chua et al. |
| 6,674,562 B1 | 1/2004 | Miles |
| 6,680,792 B2 | 1/2004 | Miles |
| 6,683,693 B1 | 1/2004 | O et al. |
| 6,693,690 B2 | 2/2004 | Umemoto |
| 6,700,695 B2 | 3/2004 | Engler et al. |
| 6,709,123 B2 | 3/2004 | Flohr |

| | | | | | | |
|---|---|---|---|---|---|---|
| 6,710,908 B2 | 3/2004 | Miles et al. | | 7,450,295 B2 | 11/2008 | Tung |
| 6,738,194 B1 | 5/2004 | Ramirez et al. | | 7,515,336 B2 | 4/2009 | Lippey |
| 6,741,377 B2 | 5/2004 | Miles | | 7,532,800 B2 | 5/2009 | Iimura |
| 6,741,384 B1 | 5/2004 | Martin et al. | | 7,545,569 B2 | 6/2009 | Cassarly |
| 6,741,503 B1 | 5/2004 | Farris et al. | | 2001/0003487 A1 | 6/2001 | Miles |
| 6,742,907 B2 | 6/2004 | Funamoto et al. | | 2001/0010630 A1 | 8/2001 | Umemoto |
| 6,742,921 B2 | 6/2004 | Umemoto | | 2001/0019380 A1 | 9/2001 | Ishihara |
| 6,747,785 B2 | 6/2004 | Chen et al. | | 2001/0019479 A1 | 9/2001 | Nakabayashi et al. |
| 6,747,800 B1 | 6/2004 | Lin | | 2001/0022636 A1 | 9/2001 | Yang et al. |
| 6,751,023 B2 | 6/2004 | Umemoto et al. | | 2001/0030861 A1 | 10/2001 | Oda |
| 6,761,461 B2 | 7/2004 | Mizutani et al. | | 2001/0049061 A1 | 12/2001 | Nakagaki et al. |
| 6,773,126 B1 | 8/2004 | Hatjasalo et al. | | 2001/0055208 A1 | 12/2001 | Koichi |
| 6,775,174 B2 | 8/2004 | Huffman et al. | | 2002/0006036 A1 | 1/2002 | Egawa |
| 6,778,155 B2 | 8/2004 | Doherty et al. | | 2002/0015215 A1 | 2/2002 | Miles |
| 6,792,293 B1 | 9/2004 | Awan et al. | | 2002/0024711 A1 | 2/2002 | Miles |
| 6,794,119 B2 | 9/2004 | Miles | | 2002/0034071 A1 | 3/2002 | Mabuchi |
| 6,798,469 B2 | 9/2004 | Kimura | | 2002/0044445 A1 | 4/2002 | Bohler |
| 6,811,267 B1 | 11/2004 | Allen et al. | | 2002/0051354 A1 | 5/2002 | Egawa |
| 6,819,380 B2 | 11/2004 | Chi-Jain et al. | | 2002/0054258 A1 | 5/2002 | Kondo et al. |
| 6,819,469 B1 | 11/2004 | Koba | | 2002/0054424 A1 | 5/2002 | Miles |
| 6,822,628 B2 | 11/2004 | Dunphy et al. | | 2002/0075555 A1 | 6/2002 | Miles |
| 6,822,780 B1 | 11/2004 | Long, Jr. | | 2002/0105699 A1 | 8/2002 | Miracky et al. |
| 6,829,132 B2 | 12/2004 | Martin et al. | | 2002/0106182 A1 | 8/2002 | Kawashima |
| 6,829,258 B1 | 12/2004 | Carlisle et al. | | 2002/0126364 A1 | 9/2002 | Miles |
| 6,853,129 B1 | 2/2005 | Cummings et al. | | 2002/0131151 A1 | 9/2002 | Engler et al. |
| 6,853,418 B2 | 2/2005 | Suzuki et al. | | 2002/0135560 A1 | 9/2002 | Akaoka |
| 6,855,610 B2 | 2/2005 | Tung et al. | | 2002/0149584 A1 | 10/2002 | Simpson |
| 6,859,218 B1 | 2/2005 | Luman et al. | | 2002/0154256 A1 | 10/2002 | Gotoh |
| 6,861,277 B1 | 3/2005 | Monroe et al. | | 2002/0172039 A1 | 11/2002 | Inditsky |
| 6,862,022 B2 | 3/2005 | Slupe | | 2002/0191130 A1 | 12/2002 | Liang et al. |
| 6,862,029 B1 | 3/2005 | D'Souza et al. | | 2003/0011864 A1 | 1/2003 | Flanders |
| 6,862,141 B2 | 3/2005 | Olczak | | 2003/0012009 A1 | 1/2003 | Suzuki |
| 6,865,312 B2 * | 3/2005 | Niv et al. .................. 385/17 | | 2003/0016930 A1 | 1/2003 | Inditsky |
| 6,867,896 B2 | 3/2005 | Miles | | 2003/0030764 A1 | 2/2003 | Lee |
| 6,870,581 B2 | 3/2005 | Li et al. | | 2003/0043157 A1* | 3/2003 | Miles .................. 345/540 |
| 6,870,654 B2 | 3/2005 | Lin et al. | | 2003/0067760 A1 | 4/2003 | Jagt |
| 6,879,354 B1 | 4/2005 | Sawayama | | 2003/0071947 A1 | 4/2003 | Shiraogawa |
| 6,880,959 B2 | 4/2005 | Houston | | 2003/0072070 A1 | 4/2003 | Miles |
| 6,882,458 B2 | 4/2005 | Lin et al. | | 2003/0083429 A1 | 5/2003 | Smith |
| 6,882,461 B1 | 4/2005 | Tsai et al. | | 2003/0086031 A1 | 5/2003 | Taniguchi et al. |
| 6,897,855 B1 | 5/2005 | Matthies | | 2003/0090887 A1 | 5/2003 | Igarashi |
| 6,912,022 B2 | 6/2005 | Lin et al. | | 2003/0095401 A1 | 5/2003 | Hanson |
| 6,930,816 B2 | 8/2005 | Mochzuki | | 2003/0098957 A1 | 5/2003 | Haldiman |
| 6,952,303 B2 | 10/2005 | Lin et al. | | 2003/0099118 A1 | 5/2003 | Saitoh |
| 6,958,847 B2 | 10/2005 | Lin | | 2003/0103177 A1 | 6/2003 | Maeda |
| 6,961,045 B2 | 11/2005 | Tsao | | 2003/0103344 A1 | 6/2003 | Niida |
| 6,964,484 B2 | 11/2005 | Gupta | | 2003/0131215 A1 | 7/2003 | Bellew |
| 6,999,236 B2 | 2/2006 | Lin et al. | | 2003/0151821 A1 | 8/2003 | Favalora et al. |
| 7,002,726 B2 | 2/2006 | Patel et al. | | 2003/0160913 A1 | 8/2003 | Yutaka et al. |
| 7,009,754 B2 | 3/2006 | Huibers | | 2003/0160919 A1 | 8/2003 | Yutaka et al. |
| 7,018,088 B2 | 3/2006 | Yu | | 2003/0169385 A1 | 9/2003 | Okuwaki |
| 7,042,643 B2 | 5/2006 | Miles | | 2003/0179383 A1 | 9/2003 | Chen et al. |
| 7,061,226 B2 | 6/2006 | Durr | | 2003/0193630 A1 | 10/2003 | Chiou |
| 7,072,096 B2 | 7/2006 | Holman et al. | | 2003/0202264 A1 | 10/2003 | Weber et al. |
| 7,110,158 B2 | 9/2006 | Miles | | 2003/0202265 A1 | 10/2003 | Reboa et al. |
| 7,123,216 B1 | 10/2006 | Miles | | 2003/0202266 A1 | 10/2003 | Ring et al. |
| 7,142,347 B2 | 11/2006 | Islam | | 2003/0206281 A1 | 11/2003 | Jain |
| 7,156,546 B2 | 1/2007 | Higashiyama | | 2003/0210222 A1* | 11/2003 | Ogiwara et al. .............. 345/103 |
| 7,161,136 B1 | 1/2007 | Wenstrand | | 2003/0210363 A1 | 11/2003 | Yasukawa et al. |
| 7,180,672 B2 | 2/2007 | Olczak | | 2003/0210367 A1 | 11/2003 | Nakano et al. |
| 7,206,133 B2 | 4/2007 | Cassarly | | 2003/0214728 A1 | 11/2003 | Olczak |
| 7,212,345 B2 | 5/2007 | Wilson | | 2004/0001169 A1 | 1/2004 | Saiki et al. |
| 7,262,754 B1 | 8/2007 | Yamazaki | | 2004/0017599 A1 | 1/2004 | Yang |
| 7,262,916 B2 | 8/2007 | Kao | | 2004/0027315 A1 | 2/2004 | Senda et al. |
| 7,324,284 B2 | 1/2008 | Olczak | | 2004/0032401 A1 | 2/2004 | Nakazawa |
| 7,352,501 B2 | 4/2008 | Chopra et al. | | 2004/0042233 A1 | 3/2004 | Suzuki |
| 7,355,780 B2 | 4/2008 | Chui | | 2004/0051929 A1 | 3/2004 | Sampsell et al. |
| 7,359,011 B2 | 4/2008 | Hamada | | 2004/0058532 A1 | 3/2004 | Miles et al. |
| 7,366,393 B2 | 4/2008 | Cassarly | | 2004/0070711 A1 | 4/2004 | Wen |
| 7,380,969 B2 | 6/2008 | Yamashita | | 2004/0080807 A1 | 4/2004 | Chen et al. |
| 7,380,970 B2 | 6/2008 | Hwang | | 2004/0080938 A1* | 4/2004 | Holman et al. .............. 362/231 |
| 7,389,476 B2 | 6/2008 | Senda et al. | | 2004/0085748 A1 | 5/2004 | Sugiura |
| 7,417,784 B2 | 8/2008 | Sasagawa | | 2004/0100796 A1 | 5/2004 | Ward |

| | | | | | | |
|---|---|---|---|---|---|---|
| 2004/0109305 A1 | 6/2004 | Chisholm | | 2006/0066935 A1 | 3/2006 | Cummings et al. |
| 2004/0115339 A1 | 6/2004 | Ito | | 2006/0072315 A1 | 4/2006 | Han et al. |
| 2004/0125048 A1 | 7/2004 | Toshihiro et al. | | 2006/0072339 A1 | 4/2006 | Li et al. |
| 2004/0125281 A1 | 7/2004 | Lin et al. | | 2006/0077123 A1 | 4/2006 | Gally |
| 2004/0145049 A1 | 7/2004 | McKinnell et al. | | 2006/0083028 A1 | 4/2006 | Sun et al. |
| 2004/0147056 A1 | 7/2004 | McKinnell et al. | | 2006/0126142 A1 | 6/2006 | Choi |
| 2004/0147198 A1 | 7/2004 | Lin et al. | | 2006/0132383 A1 | 6/2006 | Cummings et al. |
| 2004/0160143 A1 | 8/2004 | Shreeve et al. | | 2006/0164861 A1 | 7/2006 | Maeda |
| 2004/0170373 A1 | 9/2004 | Kim | | 2006/0181903 A1 | 8/2006 | Okuwaki |
| 2004/0174583 A1 | 9/2004 | Chen et al. | | 2006/0198013 A1 | 9/2006 | Sampsell |
| 2004/0175577 A1 | 9/2004 | Lin et al. | | 2006/0209012 A1 | 9/2006 | Hagood |
| 2004/0179281 A1 | 9/2004 | Reboa | | 2006/0209385 A1 | 9/2006 | Liu et al. |
| 2004/0207897 A1 | 10/2004 | Lin | | 2006/0215958 A1 | 9/2006 | Yeo |
| 2004/0207995 A1 | 10/2004 | Park | | 2006/0265919 A1 | 11/2006 | Huang |
| 2004/0209192 A1 | 10/2004 | Lin et al. | | 2006/0268574 A1 | 11/2006 | Jung |
| 2004/0209195 A1 | 10/2004 | Lin | | 2007/0116424 A1 | 5/2007 | Ting |
| 2004/0212026 A1 | 10/2004 | Van Brocklin et al. | | 2007/0189036 A1 | 8/2007 | Chen |
| 2004/0217378 A1 | 11/2004 | Martin et al. | | 2007/0196040 A1 | 8/2007 | Wang |
| 2004/0217919 A1 | 11/2004 | Pichl et al. | | 2007/0201234 A1 | 8/2007 | Ottermann |
| 2004/0218251 A1 | 11/2004 | Piehl et al. | | 2007/0210163 A1 | 9/2007 | Han |
| 2004/0218334 A1 | 11/2004 | Martin et al. | | 2007/0241340 A1 | 10/2007 | Pan |
| 2004/0218341 A1 | 11/2004 | Martin et al. | | 2007/0268695 A1 | 11/2007 | Seetzen |
| 2004/0218390 A1 | 11/2004 | Holman et al. | | 2007/0292091 A1 | 12/2007 | Fujii |
| 2004/0227493 A1 | 11/2004 | Van Brocklin et al. | | 2007/0297191 A1 | 12/2007 | Sampsell |
| 2004/0228112 A1 | 11/2004 | Takata | | 2008/0049450 A1 | 2/2008 | Sampsell |
| 2004/0240032 A1 | 12/2004 | Miles | | 2008/0084600 A1 | 4/2008 | Bita et al. |
| 2004/0240138 A1 | 12/2004 | Martin et al. | | 2008/0084602 A1 | 4/2008 | Xu et al. |
| 2004/0245588 A1 | 12/2004 | Nikkel et al. | | 2008/0100900 A1 | 5/2008 | Chui |
| 2004/0246743 A1 | 12/2004 | Lee | | 2008/0170414 A1 | 7/2008 | Wang |
| 2004/0263944 A1 | 12/2004 | Miles et al. | | 2008/0267572 A1 | 10/2008 | Sampsell |
| 2005/0001828 A1 | 1/2005 | Martin et al. | | 2009/0050454 A1 | 2/2009 | Matsukawa |
| 2005/0002082 A1 | 1/2005 | Miles | | 2009/0090611 A1 | 4/2009 | Zeijlon |
| 2005/0003667 A1 | 1/2005 | Lin et al. | | 2009/0097100 A1 | 4/2009 | Gally |
| 2005/0024557 A1 | 2/2005 | Lin | | 2009/0126792 A1 | 5/2009 | Gruhlke |
| 2005/0024849 A1 | 2/2005 | Parker | | 2009/0147332 A1 | 6/2009 | Bita et al. |
| 2005/0035699 A1 | 2/2005 | Tsai | | 2009/0147535 A1 | 6/2009 | Mienko |
| 2005/0036095 A1 | 2/2005 | Yeh et al. | | 2009/0168459 A1 | 7/2009 | Holman |
| 2005/0036192 A1 | 2/2005 | Lin et al. | | 2009/0201301 A1 | 8/2009 | Mienko |
| 2005/0038950 A1 | 2/2005 | Adelmann | | 2009/0201565 A1 | 8/2009 | Bita et al. |
| 2005/0041175 A1 | 2/2005 | Akiyama | | 2009/0201571 A1 | 8/2009 | Gally |
| 2005/0042117 A1 | 2/2005 | Lin | | | | |

FOREIGN PATENT DOCUMENTS

| | | |
|---|---|---|
| 2005/0046011 A1 | 3/2005 | Chen |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Darnera-Vankata et al. |
| 2005/0069254 A1 | 3/2005 | Schultheis |
| 2005/0078348 A1 | 4/2005 | Lin |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura |
| 2005/0168849 A1 | 8/2005 | Lin |
| 2005/0179977 A1 | 8/2005 | Chui et al. |
| 2005/0195175 A1 | 9/2005 | Anderson |
| 2005/0195462 A1 | 9/2005 | Lin |
| 2005/0231977 A1 | 10/2005 | Hayakawa |
| 2005/0248524 A1 | 11/2005 | Feng |
| 2005/0259939 A1 | 11/2005 | Rinko |
| 2005/0286113 A1 | 12/2005 | Miles |
| 2006/0001942 A1 | 1/2006 | Chui |
| 2006/0002141 A1 | 1/2006 | Ouderkirk |
| 2006/0024017 A1 | 2/2006 | Page |
| 2006/0044523 A1 | 3/2006 | Teijido |
| 2006/0050032 A1 | 3/2006 | Gunner |
| 2006/0051048 A1 | 3/2006 | Gardiner |
| 2006/0061705 A1 | 3/2006 | Onishi |
| 2006/0062016 A1 | 3/2006 | Dejima |
| 2006/0066586 A1 | 3/2006 | Gally |
| 2006/0066783 A1 | 3/2006 | Sampsell |

| | | |
|---|---|---|
| DE | 196 22 748 | 12/1997 |
| DE | 199 42 513 | 3/2001 |
| DE | 10228946 | 1/2004 |
| DE | 102007025092 | 12/2008 |
| EP | 0 278 038 | 8/1988 |
| EP | 0366117 A2 | 5/1990 |
| EP | 0389031 A1 | 9/1990 |
| EP | 0 590 511 | 4/1994 |
| EP | 0667548 A1 | 8/1995 |
| EP | 0786911 A2 | 7/1997 |
| EP | 0822441 A2 | 2/1998 |
| EP | 0830032 A2 | 3/1998 |
| EP | 0855745 A2 | 7/1998 |
| EP | 0 879 991 | 11/1998 |
| EP | 0 957 392 | 11/1999 |
| EP | 0 984 314 | 3/2000 |
| EP | 1014161 A1 | 6/2000 |
| EP | 1089115 A1 | 4/2001 |
| EP | 1 113 218 | 7/2001 |
| EP | 1 127 984 | 8/2001 |
| EP | 1 143 270 | 10/2001 |
| EP | 1 199 512 A1 | 4/2002 |
| EP | 1251454 | 4/2002 |
| EP | 1271223 A2 | 6/2002 |
| EP | 1 296 094 | 3/2003 |
| EP | 1 306 609 | 5/2003 |
| EP | 1 329 664 | 7/2003 |
| EP | 1 336 876 | 8/2003 |
| EP | 1 347 315 | 9/2003 |
| EP | 1341025 A1 | 9/2003 |

| | | |
|---|---|---|
| EP | 1 389 775 | 2/2004 |
| EP | 1389775 A2 | 2/2004 |
| EP | 1413543 A1 | 4/2004 |
| EP | 1 445 629 | 8/2004 |
| EP | 1450418 A2 | 8/2004 |
| EP | 1519218 A1 | 3/2005 |
| EP | 1 531 302 | 5/2005 |
| EP | 1 544 537 | 6/2005 |
| EP | 1 577 701 | 9/2005 |
| EP | 1 640 764 | 3/2006 |
| EP | 1 698 918 | 9/2006 |
| EP | 1 734 401 | 12/2006 |
| EP | 1 748 305 | 1/2007 |
| EP | 1 988 332 | 11/2008 |
| EP | 1 988 333 | 11/2008 |
| EP | 2 068 180 | 6/2009 |
| EP | 2 068 181 | 6/2009 |
| EP | 2 068 182 | 6/2009 |
| GB | 2 260 203 | 4/1993 |
| GB | 2278222 A | 11/1994 |
| GB | 2321532 A | 7/1998 |
| GB | 2 331 615 | 5/1999 |
| GB | 2 351 834 | 1/2001 |
| JP | 405275401 | 10/1993 |
| JP | 08-18990 | 1/1996 |
| JP | 08018990 A | 1/1996 |
| JP | 09 160032 | 6/1997 |
| JP | 09281917 A | 10/1997 |
| JP | 09 311333 | 12/1997 |
| JP | 11174234 A | 7/1999 |
| JP | 11 231321 | 8/1999 |
| JP | 11 232919 | 8/1999 |
| JP | 2000 075293 | 3/2000 |
| JP | 2000-081848 | 3/2000 |
| JP | 2000-181367 | 6/2000 |
| JP | 2000 193933 | 11/2000 |
| JP | 2001-021883 | 1/2001 |
| JP | 2001305312 | 10/2001 |
| JP | 2001/343514 A | 12/2001 |
| JP | 2002 090549 | 3/2002 |
| JP | 2002-108227 | 4/2002 |
| JP | 2002-245835 | 12/2002 |
| JP | 2003 007114 | 1/2003 |
| JP | 2003 057652 | 2/2003 |
| JP | 2003131215 | 5/2003 |
| JP | 2003 173713 | 6/2003 |
| JP | 2003 188959 | 7/2003 |
| JP | 2003188959 | 7/2003 |
| JP | 2003-315694 | 11/2003 |
| JP | 2003-344881 | 12/2003 |
| JP | 2005-259365 | 9/2005 |
| JP | 2006 107993 | 4/2006 |
| JP | 2006 120571 | 5/2006 |
| KR | 2002/010322 A | 2/2002 |
| WO | WO 95/01584 | 1/1995 |
| WO | WO 95/14256 A1 | 5/1995 |
| WO | WO95/30924 | 11/1995 |
| WO | WO 97/01240 | 1/1997 |
| WO | WO97/17628 | 5/1997 |
| WO | WO 98/19201 | 5/1998 |
| WO | WO 98/32047 | 7/1998 |
| WO | WO 98/35182 | 8/1998 |
| WO | WO99/52006 A2 | 10/1999 |
| WO | WO99/52006 A3 | 10/1999 |
| WO | WO 99/63394 | 12/1999 |
| WO | WO 00/50807 | 8/2000 |
| WO | WO 01/29148 | 4/2001 |
| WO | WO 01/57434 | 8/2001 |
| WO | WO 01/84228 | 11/2001 |
| WO | WO 01/84229 | 11/2001 |
| WO | WO 02/06858 | 1/2002 |
| WO | WO 02/024570 A1 | 3/2002 |
| WO | WO 02/071132 A2 | 9/2002 |
| WO | WO 02/097324 | 12/2002 |
| WO | WO 03/007049 A1 | 1/2003 |
| WO | WO 03/038509 | 5/2003 |
| WO | WO 03/056876 A2 | 7/2003 |
| WO | WO 03/062912 | 7/2003 |
| WO | WO 03/069413 A1 | 8/2003 |
| WO | WO 03/073151 A1 | 9/2003 |
| WO | WO 03/075207 | 9/2003 |
| WO | WO 03/105198 A1 | 12/2003 |
| WO | WO 04/006003 A1 | 1/2004 |
| WO | WO 2004/003643 | 1/2004 |
| WO | WO 2004/015489 | 2/2004 |
| WO | WO 04/026757 A2 | 4/2004 |
| WO | WO 2004/027514 A2 | 4/2004 |
| WO | WO 2004/036270 A1 | 4/2004 |
| WO | WO 2004/068460 | 8/2004 |
| WO | WO 2004/088372 | 10/2004 |
| WO | WO 2004/114418 | 12/2004 |
| WO | WO 2005/011012 | 2/2005 |
| WO | WO 2005/076051 | 8/2005 |
| WO | WO 2005/088367 | 9/2005 |
| WO | WO 2005/111669 | 11/2005 |
| WO | WO 2006/008702 | 1/2006 |
| WO | WO 2006/036415 | 4/2006 |
| WO | WO 2006/036451 | 4/2006 |
| WO | WO 2007/064133 | 6/2007 |
| WO | WO 2007/094558 | 8/2007 |
| WO | WO 2007/149474 | 12/2007 |
| WO | WO 2008/027275 | 3/2008 |
| WO | WO 2008/039229 | 4/2008 |
| WO | WO 2008/045200 | 4/2008 |
| WO | WO 2008/045207 | 4/2008 |
| WO | WO 2008/045218 | 4/2008 |
| WO | WO 2008/045222 | 4/2008 |
| WO | WO 2008/045224 | 4/2008 |
| WO | WO 2008/045310 | 4/2008 |
| WO | WO 2008/045311 | 4/2008 |
| WO | WO 2008/045312 | 4/2008 |
| WO | WO 2008/045362 | 4/2008 |
| WO | WO 2008/045363 | 4/2008 |
| WO | WO 2008/045364 | 4/2008 |
| WO | WO 2008/045462 | 4/2008 |
| WO | WO 2008/045463 | 4/2008 |
| WO | WO 2008/069877 | 6/2008 |
| WO | WO 2008/137299 | 11/2008 |
| WO | WO 2009/073555 | 6/2009 |
| WO | WO 2009/076075 | 6/2009 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface micromachined tuneable interferometer array," Sensors and Actuators, pp. 17-23 (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics, pp. 78-80 (Feb. 5, 1987).

Howard et al., "Nanometer-Scale Fabrication Techniques," VLSI Electronics: Microstructure Science, vol. 5, pp. 145-153, and pp. 166-173 (1982).

Jackson, "Classical Electrodynamics," John Wiley & Sons Inc., pp. 568-573 (date unknown).

Jerman et al., "A Miniature Fabry-Perot Interferometer Fabricated Using Silicon Micromaching Techniques," IEEE Electron Devices Society (1998).
Johnson, "Optical Scanners," Microwave Scanning Antennas, vol. 1, pp. 251-261 (1964).
"Light over Matter," Circle No. 36 (Jun. 1993).
Miles, "A New Reflective FPD Technology Using Interferometric Modulation," The Proceedings of the Society for Information Display (May 11-16, 1997).
Newsbreaks, "Quantum-trench devices might operate at terahertz frequencies," Laser Focus World (May 1993).
Oliner, "Radiating Elements and Mutual Coupling," Microwave Scanning Antennas, vol. 2, 131-157 and pp. 190-194 (1966).
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications," SID Digest, pp. 81-83 (1994).
Stone, "Radiation and Optics, An Introduction to the Classical Theory," McGraw-Hill, pp. 340-343 (1963).
Walker et al., "Electron-beam-tunable Interference Filter Spatial Light Modulator," Optics Letters vol. 13, No. 5, pp. 345-347 (May 1988).
Winton, "A novel way to capture solar energy," Chemical Week, pp. 17-18 (May 15, 1985).
Wu et al., "Design of a Reflective Color LCD Using Optical Interference Reflectors," ASIA Display '95, pp. 929-931 (Oct. 16, 1995).
Fan, et al. "Channel Drop Filters in Photonic Crystals", Optics Express, vol. 3, No. 1, 1998.
Giles, et al., "Silicon MEMS Optical Switch Attenuator and its Use in Lightwave Subsystems", IEEE Journal of Selected Topics in Quantum Electronics, vol. 5, No. 1, Jan./Feb., 1999, pp. 18-25.
Goossen, "MEMS-Based Variable Optical Interference Devices", 2000 IEEE/LEOS International Conference on Optical MEMS, pp. 17-18, Aug. 21-24, 2000.
Hohlfeld, et al., Micro-Machined Tunable Optical Filters•with optimized Band-Pass Spectrum:, 12$^{th}$ International Conference on Transducers, Solid-State Sensors, Actuators and Microsystems, vol. 2, pp. 1494-1497, Jun. 8-12, 2003.
Huang, et al., "Multidirectional Asymmetrical Microlens-Array Light Control Films for High Performance Reflective Liquid Crystal Displays", SID Digest, 2002, pp. 870-873.
Ibbotson, et al. "Comparison of XeF2 and F-atom Reactions with Si and SiO2," Applied Physics Letters. vol. 44, No. 12, Jun. 1984. pp. 1129-1131.
Joannopulos, et al., Photonic Crystals, "Molding the Flow of Light", Copyright 1995.
Kim, et al., "Control of Optical Transmission Through Metals Perforated With Subwavelength Hole Arrays", Optic Letters, vol. 24, No. 4, Feb. 15, 1999, pp. 256-257.
Lin, et al., "Free-Space Micromachined Optical Switches for Optical Networking", IEEE Journal of Selected Topics in Quantum Electronics, vol. 5, No. 1, Jan./Feb. 1999, pp. 4-9.
Little, et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Manzardo, et al., "Optics and Actuators for Miniaturized Spectrometers," International Conference on Optical MEMS, 12(6):23-24 (Dec. 2003).
Mehregany, et al., "MEMS Applications in Optical Systems", IEEE/LEOS 1996 Summer Topical Meetings, pp. 75-76; (Aug. 5-9, 1996).
Miles, MW "A MEMS Based Interferometric Modulator (IMOD) for Display Applications" Proceedings of Sensors Expo, Oct. 21, 1997 © 1997 Helmer's Publishing, Inc., pp. 281-284 XP009058455.
Miles, et al., Digital Pater for Reflective Displays, Journal of SID, 11:1, pp. 209-215, 2003.
Miles, Interferometric Modulation: MOEMS as an Enabling Technology for High-Performance Reflective Displays, Proceedings of the SPIE, 4985:28, pp. 131-139, Jan. 282, 2003.

Nagami, et al., "Plastic Cell Architecture: Towards Reconfigurable Computing for General-Purpose", IEEE, 0-8186-8900-5/98, pp. 68-77.
Obi, et al., "Fabrication of Optical MEMS in SOL-GEL Materials", 2002 IEEE/LEOS International Conference on Optical MEMS, Conference Digest, pp. 39 and 40, (Aug. 20-23, 2002).
Schnakenberg, et al. "Tmahw Etchants for Silicon Micromachining". 1991 International Conference on Solid State Sensors and Actuators - Digest of Technical Papers. pp. 815-818.
Tai, C.Y., et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378, XP000657155.
Williams, et al. "Etch Rates for Micromachining Processing", Journal of Microelectromechanical Systems. vol. 5 No. 4, Dec. 1996, pp. 256-269.
Winters, et al., "The Etching of Silicon with XeF2 Vapor". Applied Physics Letters, vol. 34. No. 1, Jan. 1979, pp. 70-73.
Zhou, et al., "Waveguide Panel Display Using Electromechanical Spatial Modulators" SID Digest, vol. XXIX, 1998.
Science and Technology:, The Economist, May 22, 1999, pp. 89-90.
XP 000657155, May 12, 1995, Tai et al.
Official Communication for European App. No. 05724222.4 dated Jun. 19, 2007.
ISR and WO for PCT Application No. PCT/US2005/006629 Filed Feb. 28, 2005.
IPRP for PCT/US05/006629 filed Feb. 28, 2005.
Office Action mailed Jan. 2, 2008 in U.S. Appl. No. 11/417,808.
Office Action mailed Jun. 29, 2007 in U.S. Appl. No. 11/417,808.
Amendment and Response to Office Action mailed Jun. 29, 2007 in U.S. Appl. No. 11/417,808.
Office Action mailed Nov. 27, 2006 in U.S. Appl. No. 11/417,808.
RCE, Amendment and Response to Office Action mailed Nov. 27, 2006 in U.S. Appl. No. 11/417,808.
Office Action mailed Jun. 14, 2006 in U.S. Appl. No. 11/417,808.
Amendment and Response to Office Action mailed Jun. 14, 2006 in U.S. Appl. No. 11/417,808.
Neal T.D. et. al., "Surface Plasmon enhanced emission from dye doped polymer layers," Optics Express, Optical Society of America, vol. 13, No. 14, Jul. 2005.
Official Communication for European App. No. 05724222.4 dated Jul. 8, 2008.
Office Action mailed Jul. 14, 2008 in U.S. Appl. No. 11/417,808.
Response to Office Action mailed Apr. 2, 2008 in U.S. Appl. No. 11/417,808.
Austrian Search Report for U.S. Appl. No. 11/064,143 dated Aug. 12, 2005 (Publication No. 2006/0132383).
Extended Search Report in European Patent No. 05255638.8 (European Publication 1 640 764) mailed on May 4, 2006.
ISR and Written Opinion for PCT/US2007/018639 dated Mar. 20, 2008 (PCT Publication No. WO 2008/027275).
ISR and WO for PCT/US2007/020969 dated Mar. 5, 2008 (PCT Publication WO 2008/045222).
ISR and Written Opinion for PCT/US2007/020911 dated Mar. 18, 2008 (PCT Publication No. WO 2008/045218).
ISR and WO for PCT/US2007/020680 dated Jul. 1, 2008 (PCT Publication WO 2008/045200).
ISR and WO for PCT/US2007/020736 dated Jul. 14, 2008 ( PCT Publication No. WO 2008/045207).
ISR and Written Opinion for PCT/US2007/021378 dated Mar. 5, 2008 (PCT Publication No. WO 2008/045312).
ISR and WO for PCT/US2007/021376 dated Jun. 18, 2008 (PCT Publication No. WO 2008/045311).
ISR and Written Opinion for PCT/US2007/021460 dated May 14, 2008 (PCT Publication No. WO 2008/045364).
Partial International Search Report for PCT/US2007/022736 dated Jun. 16, 2008 (PCT Publication No. WO 2008/069877).
ISR and WO mailed on Dec. 13, 2007 in PCT/US2007/014385 (WO 2007/149474).
ISR and Written Opinion for PCT/US2007/021459 dated May 14, 2008 (PCT Publication No. WO 2008/045363).

ISR and Written Opinion for PCT/US2007/021375 dated May 14, 2008 (PCT Publication No. WO 2008/045310).

ISR and Written Opinion for PCT/US2007/021458 dated May 14, 2008 (PCT Publication No. WO 2008/045362).

ISR and Written Opinion for PCT/US2007/020999 dated Apr. 8, 2008 (PCT Publication No. WO 2008/045224).

ISR and WO for PCT/US2008/061046 dated Oct. 1, 2008 (International Publication No. WO 2008/137299).

European Search Report in App. No. 08153436.4 dated Oct. 1, 2008 (European Publication EP 1988332).

European Search Report in App. No. 08153770.6 dated Sep. 29, 2008 (European Publication EP 1988333).

Written Opinion for International Application No. PCT/US 07/04277 dated Apr. 3, 2008 (Publication No. WO 2008/039229).

Amendment and Response to Office Action dated Jan. 13, 2009 in U.S. Appl. No. 11/417,808.

Official Communication in Mexican Patent App. No. 6010063 dated Feb. 4, 2009.

International Search Report and Written Opinion dated Aug. 14, 2008 in International Application No. PCT/US2007/022736 (Publication No. WO 2008/069877).

Office Action dated Apr. 6, 2009 in U.S. Appl. No. 11/417,808.

International Search Report and Written Opinion in PCT/US2007/021623 (International Publication No. WO 2008/045463) dated Oct. 22, 2008.

International Search Report and Written Opinion in PCT/US2007/021622 (International Publication No. WO 2008/045462) dated Oct. 22, 2008.

Partial International Search Report in PCT/US2008/086875 dated Apr. 16, 2009.

Extended European Search Report in App. No. 08153691.4 (European Publication: EP 2 068 182) dated Mar. 25, 2009.

Extended Search Report in European App. No. 08153690 (EP 2 068 181) dated Mar. 5, 2009.

International Search Report and Written Opinion in PCT/US2008/085010 (International Publication: WO 2009/073555) dated Mar. 4, 2009.

Extended Search Report in European App. No. 08153686.4 (European Publication: EP 2 068 180) dated Apr. 17, 2009.

International Search Report and Written Opinion in PCT/US2008/085026 (International Publication: WO 2009/076075) dated Apr. 20, 2009.

Partial International Search Report and Written Opinion in PCT/US2009/033698 dated May 29, 2009.

Partial International Search Report in International App. No. PCT/US2009/033597 dated May 19, 2009.

Official Communication in Japanese Patent Application No. 2007-501906 dated Jul. 21, 2009.

International Search Report and Written Opinion in PCT/US2005/030441 (International Publication No. WO 2006/036415) dated Dec. 12, 2005.

Office Action in Japanese Application No. 2007-501906 dated Jul. 21, 2009.

Office Action in Mexican Application No. PA/a/2006/010063 dated Jul. 30, 2009.

International Search Report and Written Opinion in PCT/US2009/033597 dated Sep. 10, 2009.

Official Communication in Russian Patent App. No. 2006135114 dated Mar. 26, 2009.

Official Communication in European App. No. 05 724 222.4 dated Sep. 28, 2009.

\* cited by examiner

INTEGRATED MODULATOR ILLUMINATION

BACKGROUND

Spatial light modulators used for imaging applications come in many different forms. Transmissive liquid crystal device (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices (DMD™).

Another example of a spatial light modulator is an interferometric modulator that modulates light by interference, such as the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

Generally, the iMoD is a highly reflective, direct view, flat panel display. Because of its high reflectivity, the iMoD has little need for illumination in most lighting conditions. The typical consumer expects to be able to read electronic displays in situations where there is little ambient illumination. Some form of illumination is needed for the iMoD and other purely reflective spatial light modulators that typically use ambient illumination.

Backside illumination techniques used extensively with LCDs do not work for purely reflective spatial light modulators. A purely reflective spatial light modulator is one through which light cannot be transmitted from back to front in such a manner as to illuminate the modulator elements. It is possible to leave gaps between the elements of a purely reflective spatial light modulator to allow backside illumination to travel through and emerge at the front of the panel, but the light will not contain any image information, as the light does not actually illuminate the elements, passing them by on its path through the display panel.

In one approach, as discussed in U.S. patent application Ser. No. 10/224,029, filed Aug. 19, 2002 (Publication No. 20030043157) and shown in FIG. 1a, 'micro-lamps' 104 are manufactured into the surface of the glass 102 bonded to the glass substrate 106 of a purely reflective spatial light modulator array 108. Each micro-lamp has an inherent reflective layer 111 that assists in directing light 113 from the micro-lamp to the array 108. An antireflective (AR) coating 100 reduces the amount of incident light 109 reflected from the surface. The light incident upon the modulator array 108 travels along paths 110 through the interface 107 and eventually reaches the viewer 111. This approach is somewhat complex and requires an extra layer of glass 102, into which the arc lamps and their control circuitry must be manufactured.

In an alternative approach in the same US patent application, a light pipe is used that includes scattering centers. This approach is shown in FIG. 1b. The light source 116 is mounted on a light guide 118. The light 122 is coupled into the light guide using a collimator 120. Scatter pad, or scattering center, 124 is an area of the light guide that has been roughened with a wet or dry etch. The roughened areas are then coated with a thin film stack of an absorbing surface towards the viewer 128 and a reflective surface towards the surface 112 and ultimately the modulator array 114. Light trapped within the light guide comes in contact with the scatter pad 124 and the total internal reflection is violated, and some portion of the light 129 scatters in all directions, including towards the modulator array via a reflection off of the thin film stack 126.

In either of these approaches, there are some problems. The manufacturing process is made much more complicated with the addition of several parts. The addition of the glass 102 or the light guide 118 adds thickness to the modulator, which may create parallax issues and decrease the visual quality of the image.

BRIEF DESCRIPTION OF THE DRAWINGS

The invention may be best understood by reading the disclosure with reference to the drawings, wherein.

DETAILED DESCRIPTION OF THE EMBODIMENTS

Figure 1A:
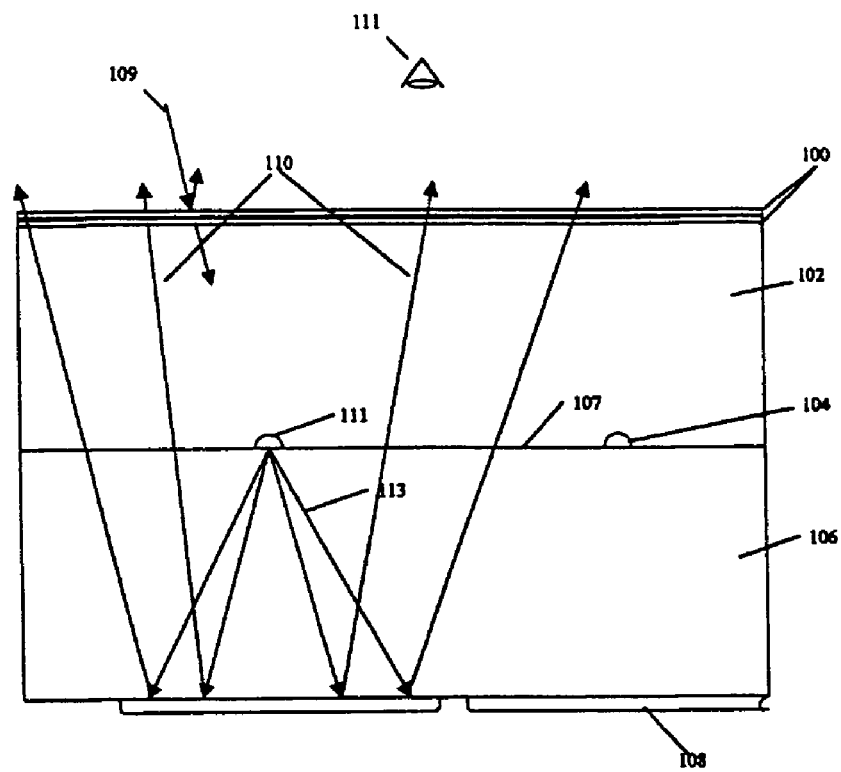
FIGS. 1a and 1b show prior art embodiments of methods to illuminate a purely reflective spatial light modulator.
Figure 1B:
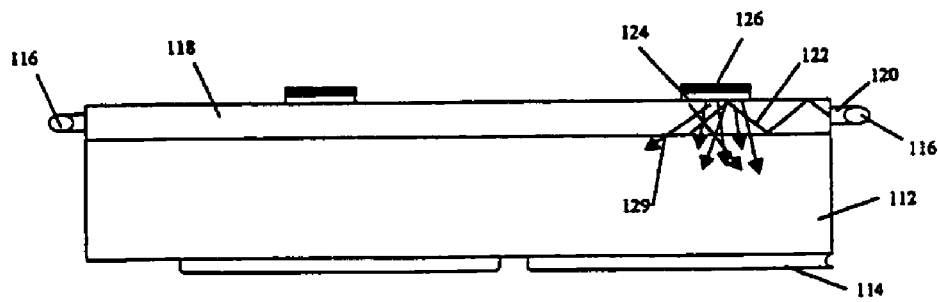
Figure 2:
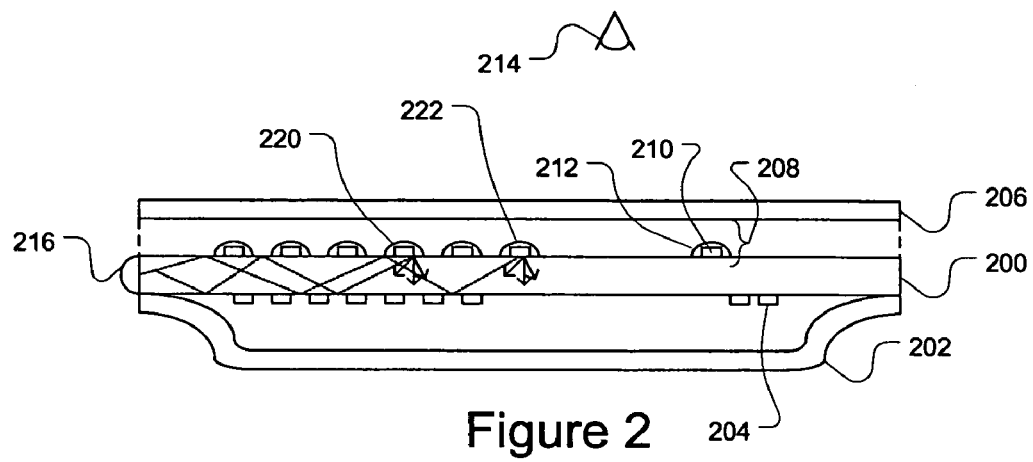
FIG. 2 shows an example of a spatial light modulator having illumination dots.

An embodiment of a purely reflective spatial light modulator having illumination dots is shown in FIG. 2. The spatial light modulator in this example is an interferometric modulator that modulates light by controlling the depth of a cavity between movable mirrors and optical films fabricated directly on the transparent substrate 200. Each element 204 of the array includes a miniature mirror suspended from the substrate. These mirrors can be individually activated to modulate the light that travels through the diffuser 206 and through the substrate 200 to reach the element 204. Each modulator element, when activated, can alter the color seen by a viewer 214 on the opposite side of the glass. Layer 202 acts as a back plate for the modulator and is generally opaque, rendering this type of modulator difficult to use with backlighting. The elements such as 204 are themselves opaque, which also makes backlighting difficult.

With application of a front lighting scheme, however, illumination dots 208 formed at the interface between the diffuser 206 and the substrate 200 can provide illumination for the display. Each dot 208 is comprised of a first layer 210 that is reflective towards the modulator array and a second layer 212 that is absorbing towards the viewer. This is similar to the scattering centers mentioned above, except that there is no need to add the extra step of wet or dry etching the substrate, as the illumination dots may be formed on the surface of the transparent substrate or the diffuser by various types of printing or thin film deposition techniques. While it is not necessary, the etching techniques may also be used on the transparent substrate if desired.

For purposes of discussion here, the display panel may be a combination of the substrate 200 and the diffuser 206, the substrate and an antireflective film, or just the substrate 200. The front panel has two surfaces. The first surface is that surface through which the viewer sees the modulated light. The second surface is that which is directly adjacent the modulator array. The first surface may have the diffuser on it, with the illumination dots considered to be on the first surface, regardless of whether they are formed on the substrate or the diffuser.

Interferometric modulators may use only ambient illumination. When used to create direct-view displays, they can utilize incoming light to form the images seen by the viewer. Illumination dots together with a light source associated with the display can supplement ambient light, increasing the brightness of the display. In total darkness, the illumination dots and the associated light source can provide all necessary illumination for the display. FIG. 2 also shows a light source 216, such as a cold cathode fluorescent tube or an edge emitting light pipe illuminated by a light emitting diode (LED), residing at one edge of the transparent substrate 200. Light emitted by the light source and properly injected into the transparent substrate would travel through the transparent substrate due to total internal reflection. It can be seen that light striking an illumination dot is reflected in several different directions as shown at dots 220 and 222.

The placement of the dots can be optimized depending upon the nature of the illumination and the environment in which the modulator may be used. For example, in FIG. 3a, the dot pattern is a very regular one. Dots in the dot pattern, such as dot 302, scatter light which subsequently strikes modulator elements such as elements 304a and 304b. The light scattered from dot 302 may have been internally reflected several times within transparent substrate 200 before striking dot 302 and being scattered.

Light injected into the transparent substrate will be internally reflected in the substrate. Without dots or some other perturbing surface structure this light will continue to traverse the substrate. With the use of illumination dots, the dot pattern can create uniform illumination. Various schemes can be applied to vary spacing in a regular way across the face of the transparent substrate to create uniform light emission, such as those shown in FIGS. 3b and 3c.

Figure 3A:
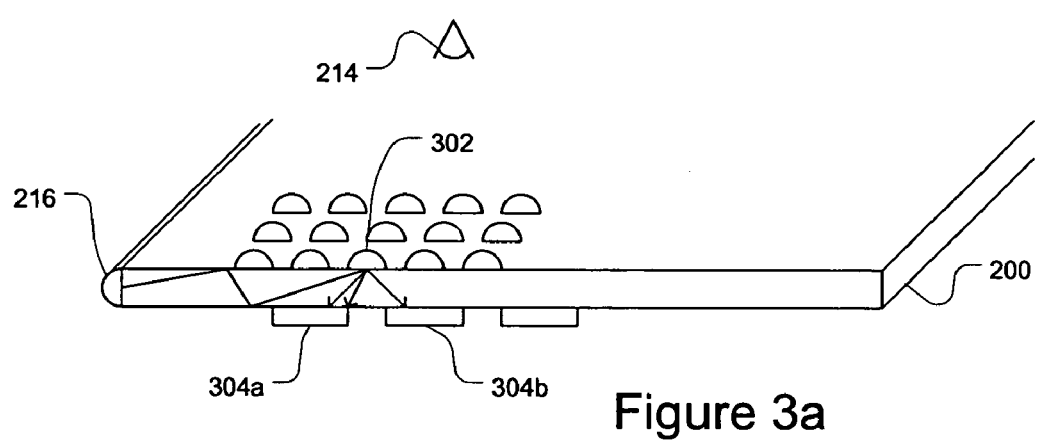
FIGS. 3a, 3b and 3c show different embodiments of illumination dot patterns used with an edge light.
Figure 3B:
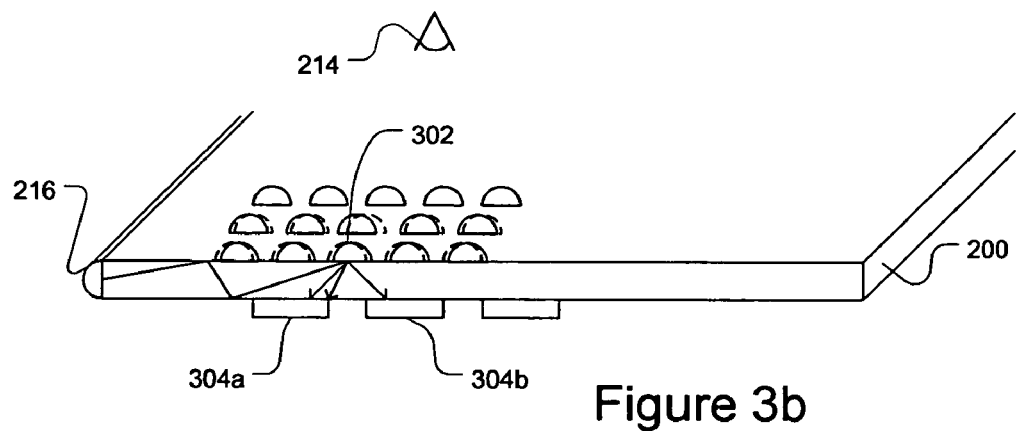
Figure 3C:
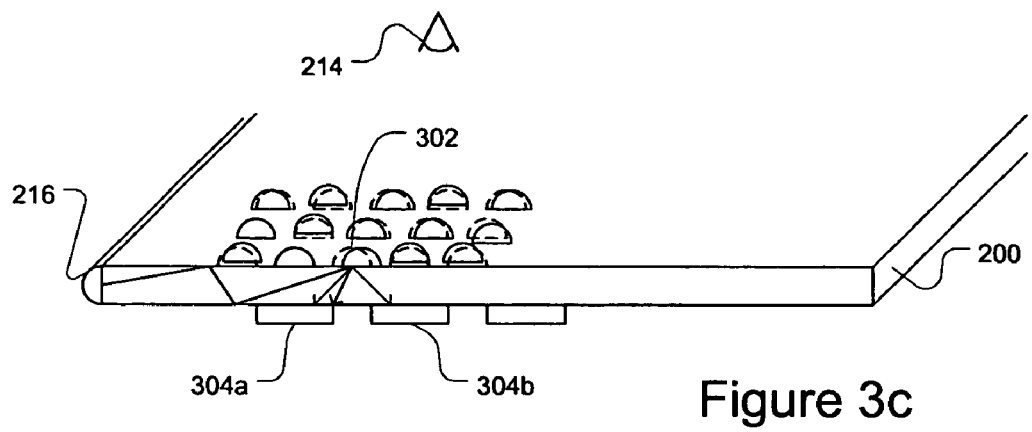

In FIG. 3b, the dot pattern is varied, but in a regular fashion, referred to here as a regular and varied pattern. The dot pattern of FIG. 3a is shown in dotted lines for comparison. As can be seen, each row, such as the one including element 302 is displaced from its previous position with a uniform variation. In the particular example of FIG. 3b, the first row varies 'forward' a particular distance from the previous position, and the second row varies a similar distance 'backwards.' This is just one example of a varied pattern with regular variation. FIG. 3c, in comparison not only employs variation but also includes spatial dithering as well, for a regular, varied and dithered pattern.

In general, the dots will be of a size too small to resolve by the vision of a human observer viewing the display at a normal viewing distance. Undesirable artifacts can sometimes still be created by arrays with features that are not individually resolvable. Careful design of the variation of the pattern, and/or the variation and dithering of the pattern and/or the fundamental spacing and arrangement of the pattern can be used to mitigate or eliminate any such undesirable artifacts.

The embodiments of FIGS. 3a–3c are directed to an edge lighting scheme, essentially a scheme in which the elements are 'front' lit. It is possible to also use a backlighting scheme. Use of back light with a purely reflective modulator on a transparent substrate may also suffer from some limitations.

Figure 4:
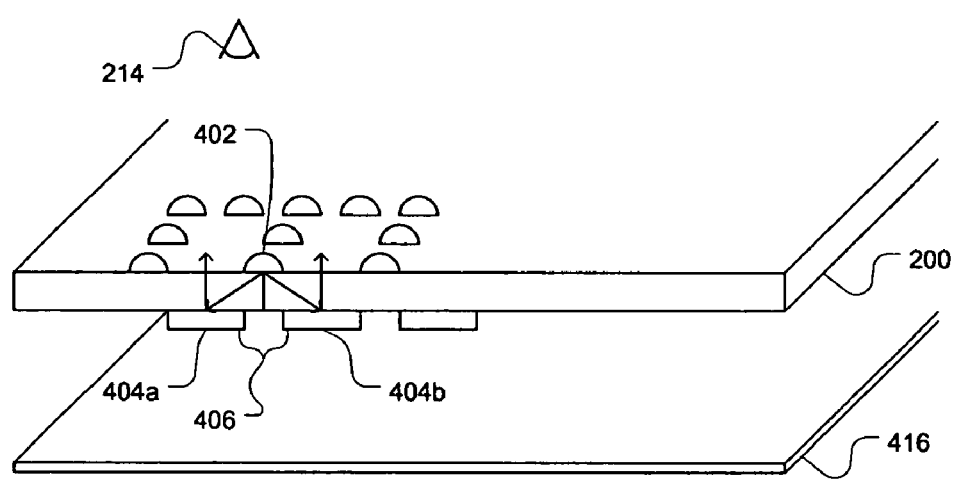
FIG. 4 shows an embodiment of an illumination dot pattern used with a back light.

The limitations in using a backlight with a purely reflective spatial light modulator array arise because the light travels from behind the modulating elements, such as elements 404a and 404b in FIG. 4, towards the viewer 216. The light can pass only through the very small gaps, such as 406, between the elements 404a and 404b. The modulator designer generally strives to keep these gaps as small a possible to maximize the reflectivity of the modulator. This limitation can be minimized by placing the dots on the top surface of the transparent substrate directly opposite the gaps between the elements. Typically, backlights such as 416 have uniform illumination characteristics and therefore uniform spacing would be appropriate. An example of such a pattern is shown in FIG. 4, where dots such as 402 are positioned to 'fill' the gaps. It is also possible to introduce variation into the placement of dots within the gaps.

Figure 5:
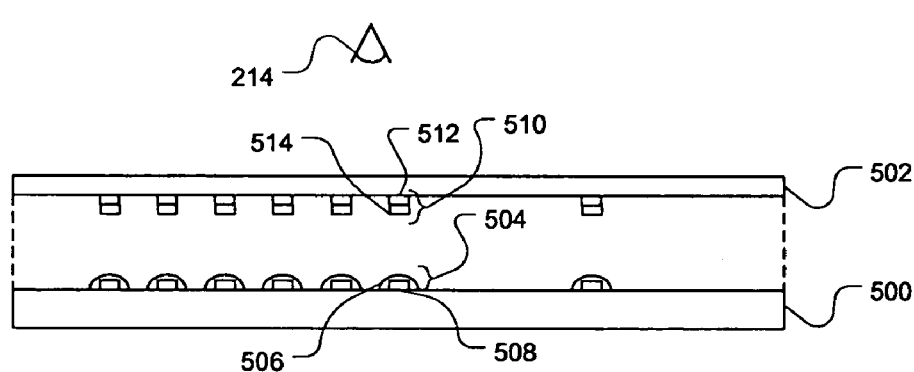
FIG. 5 shows embodiments of possible positions for illumination dots.

In addition to variation in the patterning of the dots, the surface upon which the dots are placed may also be varied. The dots will typically be placed so as to reside at the interface between the diffuser and the transparent substrate. Alternative surfaces for placement of the dots at this interface are shown in FIG. 5. The diffuser 502 is normally mated to the transparent substrate 500. For purposes of this figure, the diffuser has been lifted away from the substrate. The dots could be patterned onto the surface of the substrate 500, such as dot 504. Dot 504 has a reflective portion 508 towards the modulator array, not shown, and an absorbing portion 506 towards the viewer.

In an alternative, the dots could be placed on the surface of the diffuser 502, such as dot 510. Changing the position of the dots may modify the dot processing sequence. A dot on the surface such as 504 of the glass may have a first reflective material deposited and then covered by an 'overcoat' of absorbing material. If the dots reside on the surface of the diffuser such as 510, the absorbing material 512 would be put down first, then the reflective material 514. This maintains the proper orientation of the layers with regards to the modulator and the viewer 214.

Figure 6:
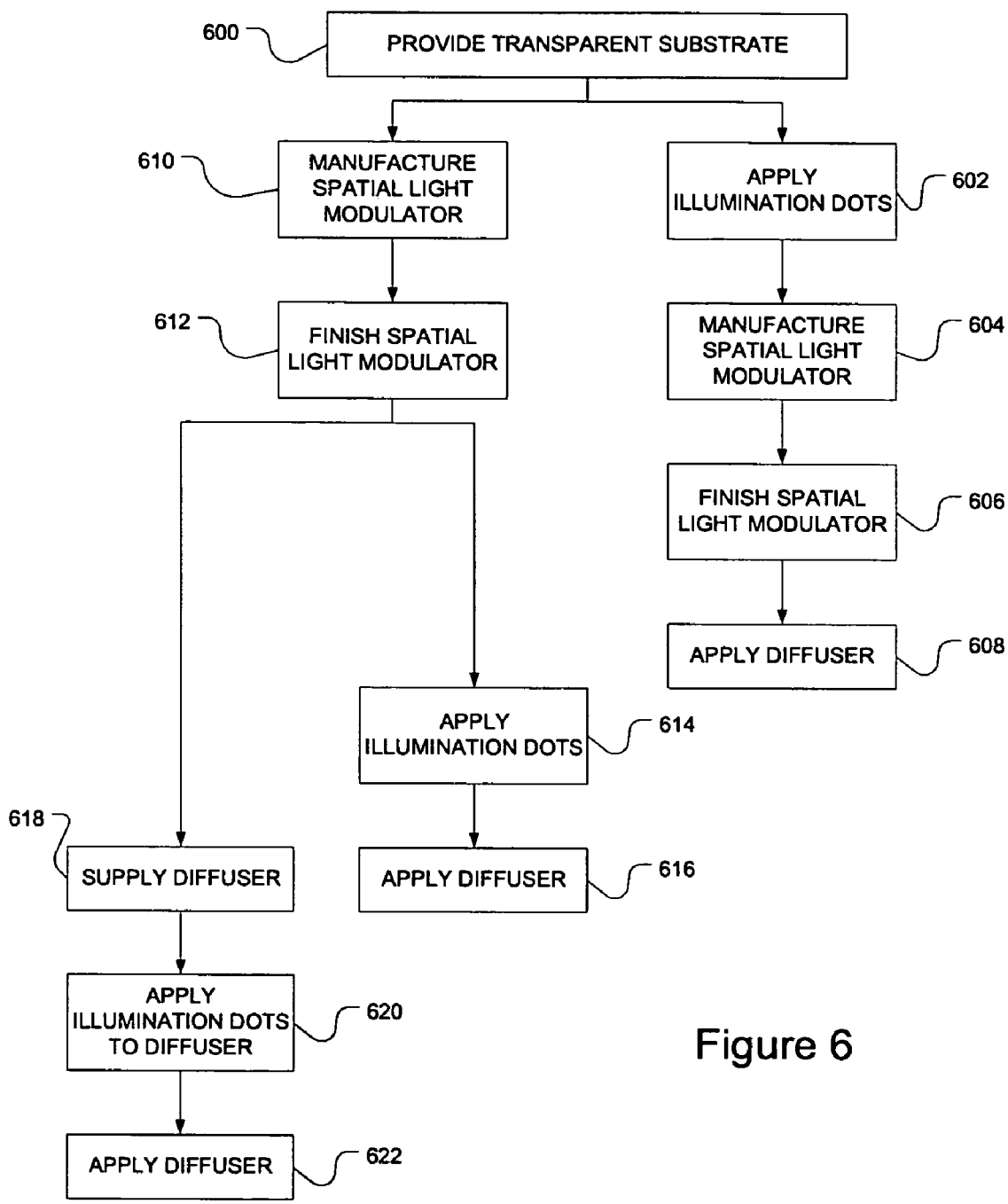
FIG. 6 shows a flow chart of a method to manufacture a spatial light modulator with illumination dots.

In addition to the flexibility in printing the dots on either the surface of the diffuser or the surface of the substrate and the flexibility as to what pattern and density the dots are printed, there is considerable flexibility as to the point in a manufacturing process the dots are formed. An embodiment of a method to manufacture a spatial light modulator array with illumination dots is shown in FIG. 6.

A first example of the process would start with providing a transparent substrate at 600. The illumination dots are applied to transparent substrate at 602. The spatial light modulator is then manufactured at 604. The modulator would be finished at 606, which may include such tasks as attaching a back plate. The diffuser is then applied to the substrate at 608, over the illumination dots. The combination of the diffuser and the transparent substrate may also be referred to as the display panel. The display panel may also comprise any other optical components, such as an antireflective film.

In an alternative embodiment, the spatial light modulator is manufactured on the 'back side' (away from the viewer) of the transparent substrate at 610. The spatial light modulator is then finished at 612. In one embodiment, the illumination dots are applied to the front side of the transparent substrate at 614 and then the diffuser is applied at 616.

In another alternative, a diffuser is supplied at 618 either after the modulator is finished at 612 or in parallel with the process of manufacturing and finishing the modulator. The illumination dots could then be applied to the diffuser at 620 and then the diffuser is applied to the transparent substrate at 622.

In any of the above embodiments, the process includes providing a transparent substrate with first and second surfaces, manufacturing the spatial light modulator on the second surface, applying the diffuser to the first surface and applying illumination dots. No order is implied by the listing the processes, as the order may change depending upon the embodiment.

For example, it may be desirable to put the dots on the substrate or the diffuser after manufacture of the modulator to allow for any printing mistakes to be made without affecting the yield of the modulator manufacture. If the dots are depositing during the manufacture process and something goes awry, it may negatively affect the yield of the process, as well as wasting an otherwise operable modulator. Putting the dots on the modulators that emerge from manufacturing may allow for more flexibility. Depending upon how the dots are formed, mistakes could be removed by cleaning the substrate with acetone or other solvents and techniques as appropriate, having no effect on the modulator elements sealed behind the substrate. Cleaning processes implemented during manufacture may damage the modulator.

The formation of the dots themselves may be done in one of many printing procedures, including lithographic printing, inkjet printing, screen-printing or any other type of printing technique. The dots could also be embossed onto the surface. Depending upon the type of technique used to deposit the dots, the shape of the dots may be controlled to maximize their effectiveness. As mentioned above, the dots would be printed at a resolution below the resolution of the human eye to avoid affecting the image quality as seen by the viewer.

Thus, although there has been described to this point a particular embodiment for a method and apparatus for illumination of purely reflective spatial light modulators, it is not intended that such specific references be considered as limitations upon the scope of this invention except in-so-far as set forth in the following claims.

What is claimed is:

1. A spatial light modulator, comprising:
   an array of display elements configured to modulate light in accordance with image data, said array of display elements comprising interferometric modulators;
   a display panel comprising a transparent substrate having forward and rearward surfaces arranged adjacent to the array of display elements such that the rearward surface is directly adjacent the array of display elements to allow a viewer to view an image produced by modulation of light, the substrate including a plurality of edges defined between said forward and rearward surfaces;
   a light source comprising an edge light, the edge light disposed laterally with respect to at least one of said edges of the transparent substrate, the light source configured to inject light into at least one edge of said substrate such that light is guided through the substrate due to total internal reflection; and
   reflective elements disposed on the forward surface of the substrate, the reflective elements configured to reflect the light guided due to total internal reflection through the substrate, thereby directing said light guided through the substrate due to total internal reflection to the array of display elements.

2. The spatial light modulator of claim 1, wherein the transparent substrate comprises glass.

3. The spatial light modulator of claim 1, the display panel further comprising a diffuser, wherein the diffuser is arranged on the forward surface of the transparent substrate, and wherein the reflective elements are disposed at an interface between the diffuser and the transparent substrate.

4. The spatial light modulator of claim 3, wherein the reflective elements reside on the diffuser.

5. The spatial light modulator of claim 3, wherein the reflective elements reside on the substrate.

6. The spatial light modulator of claim 1, wherein the display panel further comprises an antireflective film.

7. The spatial light modulator of claim 1, wherein the light source comprises a light emitting diode.

8. The spatial light modulator of claim 1, wherein the reflective elements comprise illumination dots.

9. A spatial light modulator, comprising:
   means for modulating light in accordance with image data, said modulating means comprising interferometric modulators;
   means for supporting said modulating means during fabrication of said modulation means, said supporting means having forward and rearward surfaces, said rearward surface of said supporting means being located directly adjacent to said modulating means to allow a viewer to view an image produced by modulation of light, the supporting means including a plurality of edges defined between said forward and rearward surfaces;
   means for edge illuminating the supporting means, said edge illuminating means disposed laterally with respect to at least one of the edges of said supporting means to inject light into at least one edge of the supporting means such that light is guided through the supporting means due to total internal reflection; and
   means for scattering said light guided due to total internal reflection through supporting means, said light scattering means located on said forward surface of said supporting means, thereby directing said light guided through the supporting means due to total internal reflection to said modulating means.

10. The spatial light modulator of claim 9, further comprising means for diffusing light.

11. The spatial light modulator of claim 9, further comprising means for inhibiting reflection of ambient light.

12. The spatial light modulator of claim 9, wherein said supporting means comprises a substrate.

13. The spatial light modulator of claim 9, wherein said scattering means comprises illumination dots.

14. The spatial light modulator of claim 1, wherein said reflective elements are arranged to provide uniform illumination.

15. The spatial light modulator of claim 11, wherein said ambient light reflection inhibiting means comprises an antireflective coating.

16. The spatial light modulator of claim 9, wherein said edge illuminating means light providing means comprises a light emitting diode.

17. The spatial light modulator of claim 9, wherein said edge illuminating means light providing means comprises a cold cathode fluorescent tube.

18. The spatial light modulator of claim 9, wherein said edge illuminating means comprises an edge emitting light pipe.

19. The spatial light modulator of claim 18, wherein said edge emitting light pipe is illuminated by a light emitting diode.

20. The spatial light modulator of claim 1, wherein said light is guided through the substrate due to total internal reflection from the forward and rearward surfaces of the substrate.

21. The spatial light modulator of claim 9, wherein said light is guided through the supporting means due to total internal reflection from the forward and rearward surfaces of the supporting means.

* * * * *